United States Patent [19]
Moriya

[11] Patent Number: 4,718,309
[45] Date of Patent: Jan. 12, 1988

[54] AUTOMATIC TRANSMISSION SYSTEM FOR VEHICLES

[75] Inventor: Koichi Moriya, Higashimatsuyama, Japan

[73] Assignee: Diesel Kiki Co., Ltd., Tokyo, Japan

[21] Appl. No.: 828,756

[22] Filed: Feb. 12, 1986

[30] Foreign Application Priority Data

Feb. 21, 1985 [JP] Japan .................................. 60-31537

[51] Int. Cl.$^4$ .......................................... B60K 41/10
[52] U.S. Cl. ..................................................... 74/866
[58] Field of Search .................. 74/866, 865, 861, 864

[56] References Cited

U.S. PATENT DOCUMENTS

| | | | |
|---|---|---|---|
| 4,073,203 | 2/1978 | Wurst et al. | 74/866 |
| 4,102,222 | 7/1978 | Miller et al. | 74/866 |
| 4,208,929 | 6/1980 | Heino et al. | 74/866 |
| 4,312,249 | 1/1982 | Hau | 74/866 |
| 4,350,057 | 9/1982 | Kishi | 74/865 |
| 4,457,410 | 7/1984 | Suga | 74/866 |
| 4,486,838 | 12/1984 | Itoh | 74/866 |
| 4,539,868 | 9/1985 | Habu | 74/864 |
| 4,599,917 | 7/1986 | Léorat | 74/866 |
| 4,635,508 | 1/1987 | Tatsumi | 74/866 |

FOREIGN PATENT DOCUMENTS 2080451 2/1982 United Kingdom ................ 74/864

Primary Examiner—Lawrence Staab
Attorney, Agent, or Firm—James Creighton Wray

[57] ABSTRACT

In a vehicle automatic transmission system in which the target gear position of gear-type transmission is determined by a map calculation based on predetermined map data in response to at least a condition signal indicative of vehicle speed, the system has a detector for detecting whether or not the transmission is being operated for changing gears and the target gear position is fixed during the operation for changing gears, whereby the gear change operation can be attained in stable condition regardless of the change in the vehicle speed during the gear change operation.

6 Claims, 5 Drawing Figures

AUTOMATIC TRANSMISSION SYSTEM FOR VEHICLES

BACKGROUND OF THE INVENTION

The present invention relates to an automatic transmission system for vehicles employing a gear-type transmission, in which the gear change operation of the gear-type transmission is automatically carried out with reference to a predetermined gear change map in accordance with the operating condition of the vehicle at each instant.

In the prior art, there have been proposed various automatic transmission systems for vehicles comprising a gear-type transmission with an actuator for changing gears in response to electric signals, and a gear change map for determining the appropriate gear position on the basis of the amount of operation of an accelerator pedal and the vehicle speed, whereby the gear-type transmission is automatically shifted in accordance with the result of the calculation based on the gear change map (for example, see Japanese Patent Publication No. 126141/84).

In the gear change map calculation of the prior art, the optimum gear position of the gear-type transmission is determined in accordance with only the amount of operation of the accelerator pedal and the vehicle speed. Therefore, whenever the vehicle speed increases, even, for example, at the time of hill climbing, the gear-type transmission is shifted up in accordance with the gear change map. Under certain circumstances, therefore, the vehicle speed is likely to decrease during disengagement state of the clutch required for shifting the gear-type transmission, whereby a change in the target gear position sometimes occurs. Consequently, during or just after the operation for changing gears, the gear is changed into a position other than the initial target position. This results in frequent meaningless gear shift operations, making it difficult or impossible to obtain sufficient acceleration of the vehicle and impairing the smoothness of vehicle operation.

SUMMARY OF THE INVENTION

It is an object of the present invention to provide an improved automatic transmission system for vehicles in which the operation for changing gears can be smoothly attained.

It is another object of the present invention to provide a vehicle automatic transmission system in which gear changing is carried out independently of any changes that may occur in the operating condition of the vehicle during gear changing.

According to the present invention, in vehicle automatic transmission system having means for producing a first signal relating to the vehicle speed at each instant, a gear-change mechanism including a gear-type transmission, and a calculating means for deciding the target gear position of the gear-type transmission at each instant on the basis of predetermined map data representing predetermined characteristics for changing gears in response to at least the first signal, the system comprises a first means for discriminating whether or not the transmission is being operated for changing gears, and a second means responsive to the output of the first means for inhibiting the target gear position from being changed for a predetermined period after the start of the operation for changing gears.

The second means may be constructed in such a way that the first signal is inhibited from being updated for a predetermined period just after the start of the operation for changing gears even when the vehicle speed changes. Furthermore, the second means may also be constructed so as to comprise means for stopping the calculation of the target gear position in the calculating means during gear changing, and means for holding the first signal data obtained just after the start of gear changing for a predetermined period after the termination of the gear changing.

With this construction, when the vehicle speed varies due to, for example, the depression of the accelerator pedal, the target gear position is decided by the calculating means in response to the vehicle speed. When the operation for shifting-up the transmission starts on the basis of the calculation by the calculating means, this state is detected by the first means and updating of the data indicating the vehicle speed is inhibited for a predetermined period after the start of the operation for changing gears. As a result, even if the vehicle speed decreases during the operation for changing gears, the desired operation for changing gears can be performed. Consequently, it is possible to effectively eliminate the drawback of conventional automatic transmission systems that the target gear position may be changed in the course of the operation for changing gears or that the operation for changing gears may be carried out again just after the termination of the desired operation for changing gears.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
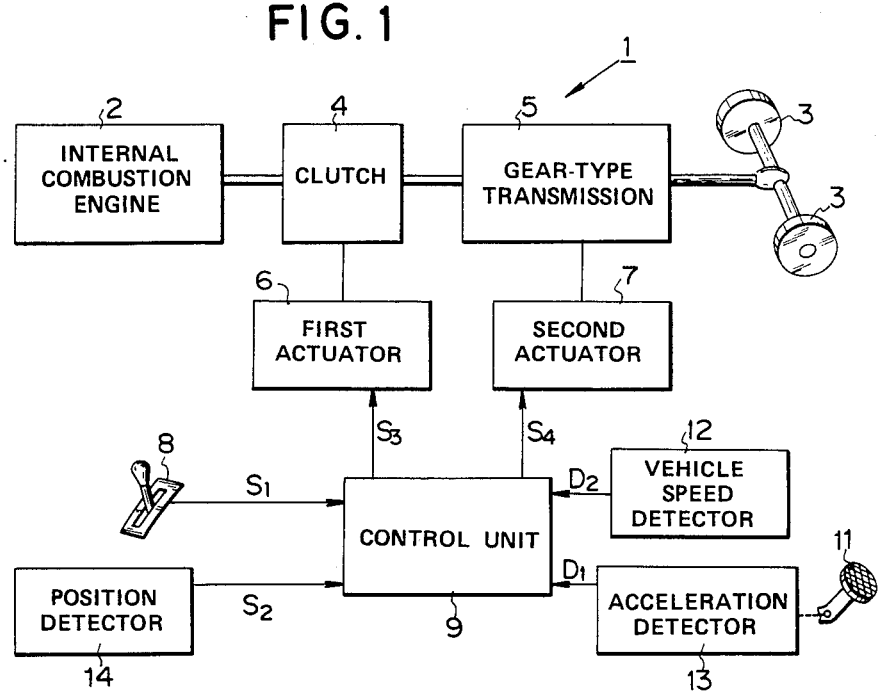
FIG. 1 is a block diagram of an embodiment of the automatic transmission system according to the present invention.

FIG. 1 is a block diagram showing an embodiment of a vehicle automatic transmission system according to the present invention. The automatic transmission system 1 for vehicles has a gear-type transmission 5 and a clutch 4 located between an internal combustion engine 2 and driving wheels 3 of a vehicle (not shown) which are driven by the output power from the gear-type transmission 5. In order to shift the gear-type transmission 5 into the desired gear position in response to electric signals, there are provided a first actuator 6 for operating the clutch 4 and a second actuator 7 for operating the gear-type transmission 5, and the first and second actuators 6 and 7 are respectively controlled in accordance with first and second control signals $S_3$ and $S_4$ supplied from a control unit 9.

In this embodiment, the gear-type transmission 5 is a conventional five-speed gear box and is operated by the second actuator 7 in response to the second control signal $S_4$ when the clutch is put in its disengaged state by the first actuator 6. Since such a mechanism for shifting a gear-type transmission in response to an electric signal is known, no detailed description of the construction thereof will be given here.

In order to obtain a condition signal for deciding the target gear position of the gear-type transmission 5, the automatic transmission system 1 is provided with a vehicle speed detector 12 and an acceleration detector 13 which is associated with an accelerator pedal 11 and produces acceleration data $D_1$ indicating the amount $\theta$ of operation of the accelerator pedal 11. The vehicle speed detector 12 produces vehicle speed data $D_2$ indicating the speed V of the vehicle (not shown) powered by the internal combustion engine 2. The acceleration data $D_1$ and the vehicle speed data $D_2$ are applied to the control unit 9, which receives a command signal $S_1$ from a selector 8 and a position signal $S_2$ from a position detector 14. The selector 8 is for selecting the operation mode of the automatic transmission system 1 and a signal indicating the desired operation mode selected by the operation of the selector 8 is produced as the command signal $S_1$ from the selector 8. The position detector 14 is associated with the gear-type transmission 5 and detects the actual gear position thereof. It produces the position signal $S_2$ showing the actual gear position at each instant.

In this embodiment, the selector 8 has a neutral (N) position, a first (1st) position, a drive (D) position and a reverse (R) position, and the control unit 9 controls a gear-change mechanism comprising the clutch 4, the gear-type transmission 5, the first actuator 6 and the second actuator 7 in accordance with the operation mode selected by the selector 8.

Figure 2:
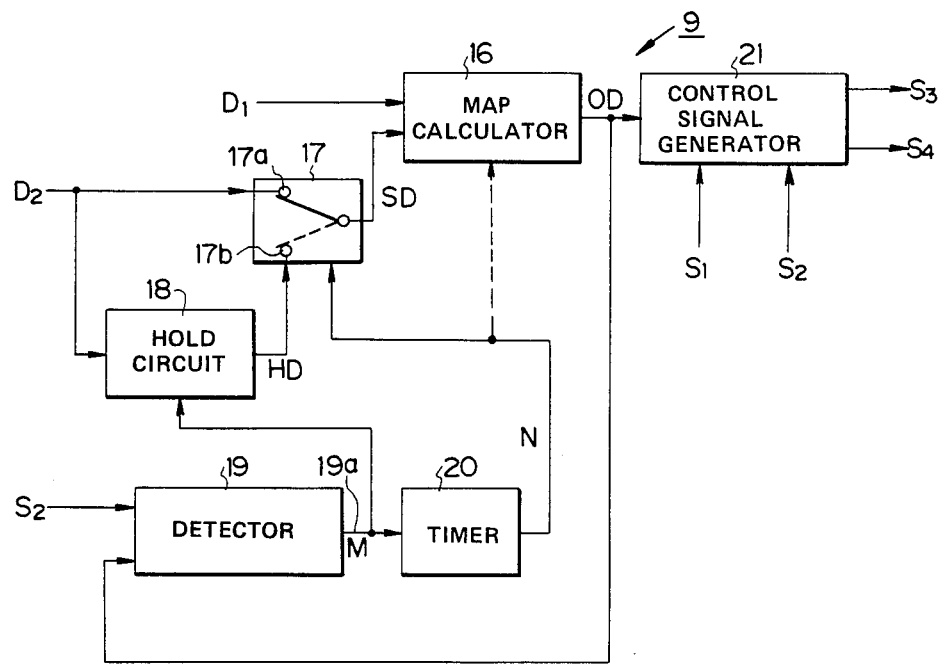
FIG. 2 is a detailed block diagram of the control unit shown in FIG. 1.

FIG. 2 shows a detailed block diagram of the control unit 9 of FIG. 1. The control unit 9 has a map calculator 16 which stores map data corresponding to the gear-change characteristics shown in FIG. 3 and calculates the optimum gear position of the gear-type transmission 5 on the basis of the map data in response to acceleration data $D_1$ and vehicle speed data $D_2$. The acceleration data $D_1$ is directly applied to the map calculator 16 and the vehicle speed data $D_2$ is applied thereto through a switch 17.

The switch 17 has a fixed contact 17a to which vehicle speed data $D_2$ is applied and the vehicle speed data $D_2$ is supplied through the switch 17 to the map calculator 16 when the switch 17 is switched over as shown by a solid line. The vehicle speed data $D_2$ is also applied to a hold circuit 18 for holding the vehicle speed data $D_2$ and the hold data HD held in the hold circuit 18 is applied to another fixed contact 17b of the switch 17. Consequently, the hold data HD is selected and applied to the map calculator 16 when the switch 17 is switched over as shown by a broken line. Thus, depending on the position of the switch 17, either the vehicle speed data $D_2$ or the hold data HD is supplied to the map calculator 16 as selected data SD. The map calculator 16 is responsive to acceleration data $D_1$ and selected data SD and produces optimum data OD showing the optimum gear position of the gear-type transmission 5 at each instant.

The control unit 9 has a detector 19 and a timer 20 to control the switch 17 and the hold circuit 18. The detector 19 is capable of detecting the timing of the start of the gear-change operation of the gear-type transmission 5 and the timing of the termination thereof in response to the position signal $S_2$ and optimum data OD. That is, the detector 19 compares the actual gear position indicated by the position signal $S_2$ with the optimum gear position indicated by optimum data OD, and a high-level signal M appears on the output line 19a of the detector 19 when the actual gear position is not the optimum gear position. The level of the signal M is low when the actual gear position coincides with the optimum gear position but when the actual gear position becomes different from the optimum gear position due to, for example, a decrease in vehicle speed, the level of the signal M becomes high at the time the actual gear position becomes different from the optimum gear position. Then, when the actual gear position comes to coincide with the optimum gear position again because of, for example, a gear changing operation in the gear-type transmission 5, the level of the detection signal M changes from high to low at the time the actual gear position comes to coincide with the optimum gear position.

That is, the time of the level change of the signal M from low to high indicates the time of the start of the operation for changing gears in the gear-type transmission 5 and the time of the level change of the signal M from high to low indicates the time of termination of the operation for changing gears in the gear-type transmission 5. Furthermore, in the case where the selector 8 is in the D position, the period that the detection signal M stays at high level shows the period during which the operation for changing gears is being carried out.

The hold circuit 18 is responsive to the signal M and holds the vehicle speed data $D_2$ at the time the level of the signal M changes from low to high. At the same time, the timer 20 is triggered in response to the level change of the signal M from low to high and the level of the output signal N of the timer 20 becomes high.

The output signal N is supplied to the switch 17 as a switching control signal, and the switch 17 is switched over from the state shown by the solid line to the state shown by the broken line when the level of the output signal N changes from low to high, whereby the hold data HD is selected by the switch 17 instead of the vehicle speed data $D_2$. The timer 20 is constructed in such a way that the high level state of the output signal N is maintained for a predetermined time $T_0$ after the level of the signal M changes from high to low.

Therefore, when for some reason the operation for changing gears starts, the vehicle speed data $D_2$ at the start of the operation for changing gears is held in the hold circuit 18 as the hold data HD and the hold data HD is supplied as information concerning the vehicle speed through the switch 17 to the map calculator 16 until the time $T_0$ has lasped from the termination of the operation for changing gears. Thus, the optimum gear position calculated by the map calculator 16 is not changed at least during the gear shift operation even if the vehicle speed should vary during the gear shift operation.

The optimum data OD from the map calculator 16 is applied to a control signal generator 21 to which the command signal $S_1$ and the position signal $S_2$ are applied. The control signal generator 21 is responsive to the optimum data OD and the signals $S_1$ and $S_2$, and produces the first and second control signals $S_3$ and $S_4$ for positioning the gear of the gear-type transmission 5 at the position decided in accordance with the optimum data OD and the signals $S_1$ and $S_2$. That is, when the command signal $S_1$ indicates that the 1st position has been selected by the selector 8 and the position signal $S_2$ indicates a position other than the 1st position, signals for shifting the gear-type transmission 5 to the 1st position are produced as the first and second control signals $S_3$ and $S_4$. When the gear is already in the 1st position in this case, no operation for changing gears is carried out. Similarly to the foregoing operation, when the N or R position is selected, the first and second control signals $S_3$ and $S_4$ are produced for shifting to the N or R position, provided that the transmission is not already in the N or R position.

When the D position is selected by the selector 8, the control signal generator 21 produces first and second control signals $S_3$ and $S_4$ for operating the first and second actuators 6 and 7 so as to shift the gear-type transmission 5 into the gear position indicated by the optimum data OD. That is, the optimum gear position is decided in the map calculator 16 in accordance with the map data corresponding to the characteristic curve shown in FIG. 3 on the basis of the vehicle speed V indicated by selected data SD and the amount $\theta$ of angle or degree of depression of the accelerator pedal 11 indicated acceleration data $D_1$. When the gear position indicated by optimum data OD becomes different from that shown by the position signal $S_2$, the detector 19 detects such fact and the vehicle speed data $D_2$ at that time is held by the hold circuit 18. At the same time, the hold data HD is selected as selected data SD by the switch 17 and the hold data HD is applied as selected data SD to the map calculator 16. Therefore, the optimum data OD is calculated in accordance with acceleration data $D_1$ and selected data SD at the start of operation for changing gears while the switch 17 is in the position shown by the broken line, in the manner as described herebefore.

Thus, the gear-type transmission 5 is assured of being shifted into the optimum gear position for the operating condition of the vehicle without the occurrence of unnecessary gear changing operations, even if the vehicle speed varies during the operation for changing gears.

Figure 3:
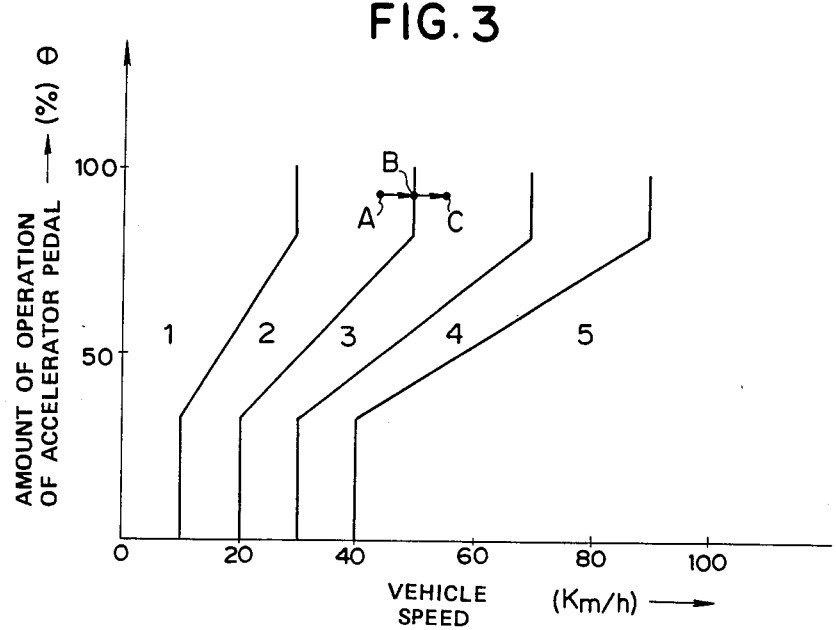
FIG. 3 is a graph showing gear change characteristic curves used for calculating the optimum gear position in the automatic transmission system of FIG. 1.

Therefore, for example, when the operating condition of the vehicle changes from point A to point C through point B in FIG. 3, due to a change in the vehicle speed, the operation for changing gears from the 2nd position to the 3rd position is carried out at the time the operating condition of the vehicle assumes the state indicated by the point B. Although the actual vehicle speed varies from moment to moment even during the gear change operation, since the value of the vehicle speed at the operating point B is held in the hold circuit 18 and the hold data HD indicating the vehicle speed at the point B is applied to the map calculator 16, the system 1 operates so as to shift the gear-type transmission 5 from 2nd position to 3rd position, regardless of the actual vehicle speed at each instant. Furthermore, in this embodiment, the supply of the hold data HD is continued for the period $T_0$ following the termination of the operation for changing gears, so that normal gear-change operation can be carried out again after the time $T_0$ has passed.

As a result, in the case where the gear-type transmission 5 is shifted up due to an increase in the vehicle speed during the hill climbing, this shift-up operation is assured even if the vehicle speed decreases during the operation for changing gears. Accordingly, if the vehicle speed increases after the termination of the operation for shifting-up the gear-type transmission 5 and reaches the speed at the start of the gear shift operation at the time the period $T_0$ has passed, the vehicle is able to continue operation at this new gear position without the execution of another operation for changing gears. Consequently, even if the operation for changing gears is carried out during hill climbing, the invention effectively prevents shifting of the gear-type transmission to an undesired gear position during the operation for changing gears and also prevents any additional operation for changing gears just after the desired operation has been carried out. As a result, insufficient acceleration and deterioration of the driving feeling are prevented.

Although the embodiment described above is constructed in such a way that the vehicle speed data $D_2$ at the start of the operation for changing gear is held for a predetermined period, the present invention is not limited to this construction. Foe example, as shown by the broken line in FIG. 2, the signal N may be supplied to the map calculator 16 so as to inhibit the map calculator 16 from calculating the optimum gear position during the high level of the signal N, and the vehicle speed data $D_2$ at the start of the operation for changing gears can be held and supplied to the map calculator 16 during a predetermined period just after the termination of the operation for changing gears With such a construction, since the calculation of the map calculator 16 is forcibly stopped, no change in the optimum gear position during the operation for changing gear and time $T_0$ following the termination of the gear change operation will be carried out. In this case, vehicle speed data $D_2$ may be directly supplied to the map calculator 16 without the use of the switch 17 and the hold circuit 18.

Figure 4:
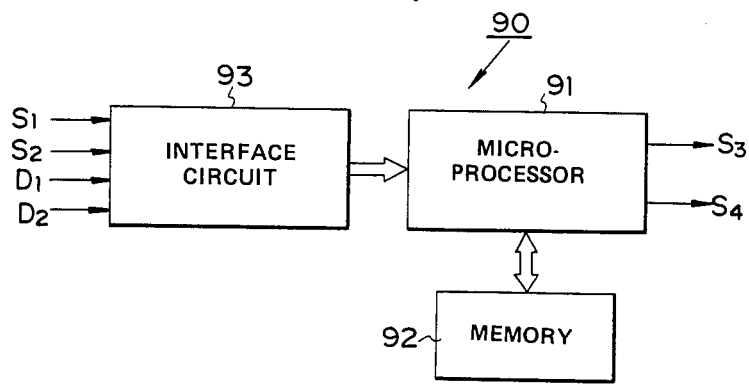
FIG. 4 is a block diagram showing another embodiment of the control unit shown in FIG. 1.

A function similar to that of the control unit 9 shown in FIG. 2 can be attained by another control unit which is constructed by the use of a microprocessor and a memory. Such a control unit 90 is shown in FIG. 4. The control unit 90 has a microprocessor 91 and a memory 92 in which map data corresponding to the gear-change characteristics shown in FIG. 3. The microprocessor 91 receives the data $D_1$, $D_2$ and the signals $S_1$ and $S_2$ through an interface circuit 93 and the calculation for controlling the first and second actuators 6 and 7 is executed in the microprocessor 91 in accordance with a control program stored in the memory 92. As result, a control operation similar to that attained by the control unit 9 can be performed.

Figure 5:
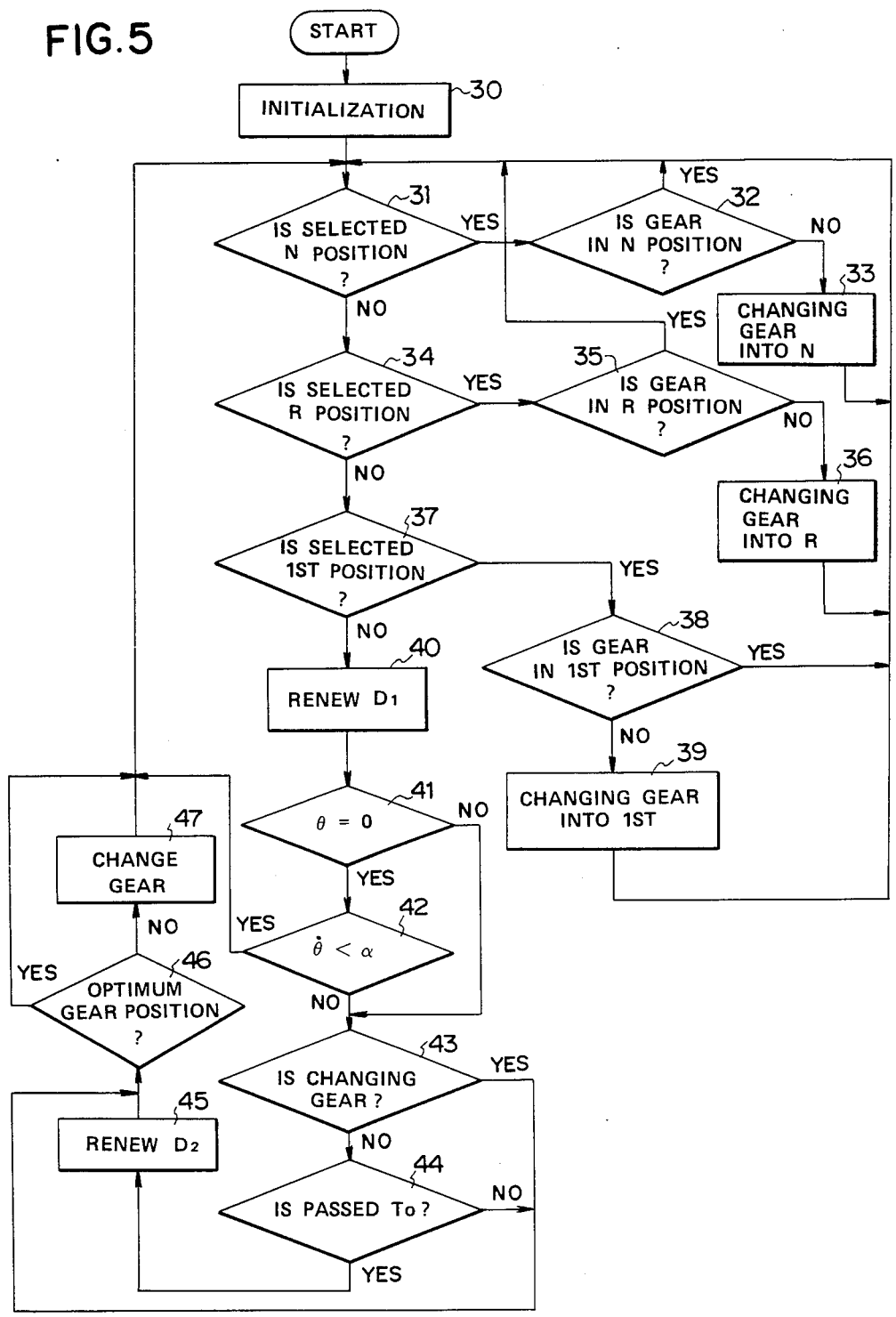
FIG. 5 is a flow chart representing a program executed by the microprocessor of the system shown in FIG. 4.

The control program executed in the micreprocessor 91 will be described in conjunction with a flowchart shown in FIG. 5.

After start of the execution of this program, initialization is executed in step 30 and data are read in. Then, the operation moves to step 31 in which a decision is made on the basis of the command signal $S_2$ so as to whether the N position is selected by the selector 8. When the decision in step 31 is YES, the operation moves to step 32 in which a decision is made as to whether the actual gear position is neutral. The operation returns to step 31 when the decision in step 32 is YES, while the operation moves to step 33 wherein the gear is changed to the neutral position when the decision in step 32 is NO. After the execution of step 33, the operation returns to step 31.

When the decision in step 31 is NO, the operation moves to step 34 wherein a discrimination is made on the basis of the command signal $S_2$ as to whether the R position is selected by the selector 8. When the decision in step 34 is YES, the operation moves to step 35 in which a discrimination is made as to whether or not the actual gear position is reverse. The operation returns to step 31 when the decision in step 35 is YES, while the operation moves to step 36 wherein the transmission is shifted into the reverse position when the decision in step 35 is NO. After the execution of step 36, the operation returns to step 31.

When the decision in step 34 is NO, the operation moves to step 37 wherein a discrimination is made on the basis of the command signal $S_2$ as to whether the 1st position is selected by the selector 8. When the decision in step 37 is YES, the operation moves to step 38 in which a discrimination is made as to whether or not the actual gear position is first. The operation returns to step 31 when the decision in step 38 is YES, while the operation moves to step 39 wherein the gear is changed to first when the decision in step 38 is NO. After the execution of step 39, the operation returns to step 31.

When the decision in step 37 is NO, the operation moves to step 40 wherein the acceleration data $D_1$ is updated. After this, the operation moves to step 41 where in a decision is made as to whether or not the amount $\theta$ of the operation of the accelerator pedal 11 is zero. When $\theta=0$, in order to detect whether or not accelerator pedal operation for applying engine braking is being carried out by the operator, the operation moves to step 42 wherein a decision is made as to whether or not the value $\dot{\theta}$ which is differented value indicating the rate of change in $\theta$, is less than a predetermined value $\alpha(<0)$. When the descrimination in step 42 is YES, that is, when the amount $\theta$ has become zero because of the sudden release of the depression of the accelerator pedal 11, the operation returns to step 31.

If the decision in step 42 is NO, it is considered that the operator does not intent to apply engine braking, so that the operation moves to step 43.

In step 43, a decision is made as to whether the operation for changing gears is now being carried out, and a further decision is made in step 44 as to whether a predetermined period $T_0$ has passed after the termination of the operation for changing gears when the decision in step 43 is NO. When the decision in step 44 is YES, the operation moves to 45 wherein the vehicle speed data $D_2$ is updated and a decision is made in step 46 as to whether the gear position at this time is optimum. That is, in step 46, the map calculation for obtaining the optimum gear position is carried out on the basis of the map data stored in the memory 92 in accordance with the data $D_1$ and $D_2$ and the result is compared with the position signal $S_2$. The operation then moves to step 47 wherein the operation for shifting the gear-type transmission 5 to the optimum gear position is carried out when the decision in step 46 is NO, while the operation moves to step 31 without the execution of step 47 when the decision in step 46 is YES.

When the accelerator pedal 11 is depressed and the amount $\theta$ is not equal to zero, the decision in step 41 is NO, so that the operation moves to step 43 without the execution of step 42.

I claim:

1. An automatic transmission system for vehicles comprising:
    means for producing a first signal relating to the speed of the vehicle at each instant;
    a gear-changing mechanism including a gear-type transmission;
    a calculating means for deciding a target gear position of the gear-type transmission at each instant on the basis of predetermined characteristics for changing gears in response to at least the first signal;
    a position detecting means for detecting the actual gear position of the gear-type transmission;
    means response to outputs from said calculating means and said position detecting means for changing gear of said gear-change mechanism in such a way that the actual gear position becomes equal to the target gear position;
    a first means for discriminating whether or not the target gear position is changed; and
    a second means responsive to the output of said first means for inhibiting the target gear position from being changed for a predetermined period after the target gear position is changed, wherein said second means has
    a holding means responsive to output of said first means for holding the contents of the first signal at the time of the change of the target gear position,
    a selecting means responsive to the output of said first means for selecting one or the other of the first signal and an output from said holding means, whereby the output from said holding means is selected for a predetermined period at least during the execution of the operation for changing gears of the gear-type transmission.

2. A system as claimed in claim 1, wherein the predetermined period is from a time of the change of the target position to a time of the termination of a predetermined time following the end of gear-change operation thereof.

3. A system as claimed in claim 1 wherein said second means is means for inhibiting the first signal from being renewed for a predetermined period.

4. A system as claimed in claim 1 wherein said first means discriminates whether or not the currant actual gear position is equal to the target gear position in responce to the output of said calculating means and the output of said position detecting means.

5. A system as claimed in claim 1 wherein the predetermined period is longer than a time necessary for carrying out a desired gear change operation at that time.

6. An automatic transmission system for vehicles comprising:
    means for producing a first signal relating to the speed of the vehicle at each instant;
    a gear-changing mechanism including a gear-type transmission;
    a calculating means for deciding a target gear position of the gear-type transmission at each instant on the basis of predetermined characteristics for changing gears in response to at least the first signal;
    a position detecting means for detecting the actual gear position of the gear-type transmission;
    means responsive to outputs from said calculating means and said position detecting means for changing gear of said gear-change mechanism in such a way that the actual gear position becomes equal to the target gear position;
    a first means for discriminating whether or not the target gear position is changed; and
    a second means responsive to the output of said first means for inhibiting the target gear position from being changed for a predetermined period after the target gear position is changed, wherein said second means has a holding means responsive to the output of said first means for holding the contents of the first signal at the time of the change of the target gear position, a selecting means for selecting one or the other of the first signal and an output from said holding means, and a timer means responsive to the output of said first means for controlling said selecting means so as to select the output from said holding means from the time of the change of the target gear position to a time a predetermined period after the termination of the gear change operation based on the target gear position at that time.

* * * * *

UNITED STATES PATENT OFFICE
CERTIFICATE OF CORRECTION

Patent No. 4,718,309　　　　　　　　　Dated January 12, 1988

Inventor(s) Koichi Moriya

It is certified that error appears in the above-identified patent and that said Letters Patent are hereby corrected as shown below:

Column 8, line 8, change "response" to --responsive--.

Column 8, line 39, change "currant" to --current--.

Signed and Sealed this

Tenth Day of May, 1988

*Attest:*

DONALD J. QUIGG

*Attesting Officer*　　　*Commissioner of Patents and Trademarks*